United States Patent Office 2,748,132
Patented May 29, 1956

2,748,132
NORTROPANE DERIVATIVES

Paul Karrer, Zurich, and Jindrich Kebrle, Basel, Switzerland, assignors to Sandoz A. G., Basel, Switzerland, a Swiss firm No Drawing. Application February 28, 1955,
Serial No. 491,204

Claims priority, application Switzerland March 3, 1954

4 Claims. (Cl. 260—292)

The present invention is concerned with nortropane derivatives. More particularly, it relates to nortropane derivatives which correspond to the formula:

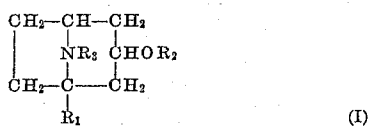

wherein $R_1$ stands for an alkoxyalkyl group, or a free or esterified carboxyl or hydroxyalkyl group, $R_2$ stands for a carboxylic acid acyl group, and $R_3$ stands for a lower alkyl group, and also to the salts and quaternary ammonium compound of said derivatives.

Carboxylic acids from which the new esters are derived include, for example, lower fatty acids, such as acetic acid, propionic acid, butyric acid, valeric acid, isovaleric acid, tiglic acid, etc.; aromatic carboxylic acids, such as benzoic acids, for example benzoic acid, alkoxy benzoic acids, methylene dioxy benzoic acids, etc.; and aralipliatic acids, such for example as tropic acid, phenyl lactic acid, mandelic acid, fluorenyl-9-carboxylic acid, 9-hydroxy-fluorenyl-9-carboxylic acid, benzilic acid, diphenyl acetic acid, phenyl-cyclohexyl acetic acid, phenyl-1-hydroxy-cyclohexyl acetic acid, xanthene-9-carboxylic acid, etc.

Especially suitable quaternary ammonium compounds are such as contain on the nitrogen atom as additional substituent a lower alkyl group, for example halogen methylates.

These nortropane derivatives of Formula I are severally advantageously prepared by condensing the appropriate γ-ketoaldehyde corresponding to the formula

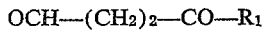

OCH—(CH₂)₂—CO—R₁ wherein $R_1$ has the aforesaid significance, with the corresponding primary amine and with acetone-dicarboxylic acid to produce a nortropinone derivative of the formula

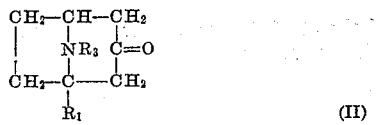

wherein $R_1$ and $R_3$ have the aforesaid significances, preparing the corresponding nortropine derivative from Compound II by reduction thereof with nascent or catalytically activated hydrogen, and esterifying the so-obtained nortropine derivative with an acid of the formula

HO—R₂ wherein $R_2$, as above, is acyl.

The said process may, for example, be carried out by condensing for instance 5-methoxylevulinaldehyde—prepared by the hydrolysis of 2,5-dimethoxy-2-methoxymethyl-tetrahydrofurane with 0.1-normal sulfuric acid—with e. g. methylamine and acetone-dicarboxylic acid in buffered aqueous solution at room temperature (e. g. 20–30° C.), and isolating the resultant 1-methoxymethyl-tropinone by extraction with a water-immiscible solvent. Reduction of the 1-methoxymethyl-tropinone yields the corresponding aminoalcohol, the tropine derivative resulting if the reduction is carried out with catalytically activated hydrogen, and the pseudo-tropine derivative being obtained if nascent hydrogen is employed. Both derivatives, upon acylation, yield the corresponding acyl derivatives.

Alternatively, the nortropinone derivatives of this invention can be synthesized by starting from a γ-ketoaldehyde which contains an acylatable group in the 5-position, as for example from 5-hydroxy-levulinaldehyde—obtained from 2,5-dimethoxy-2-hydroxymethyl-tetrahydrofurane—whereupon the product is a nortropinone derivative containing an acylatable group in the 1-position, in the mentioned case a 1-hydroxymethyl-nortropinone. This product can, prior to reduction to the notropine derivative, be acylated at the 1-hydroxymethyl group to the 1-acyloxymethyl-nortropinone which, in turn, upon reduction and subsequent esterification yields a 1-acyloxymethyl-3-acyloxy-nortropane derivative.

The acylation can be carried out in per se known manner, for example by treatment with an acid halide in the presence or absence of an acid-binding agent, by treatment with an acid anhydride, or by alcoholysis, i. e. by the action of an acid ester on the alcohol-like tropane derivative under the catalytic influence of an alkali metal.

The compounds used as starting materials can also be used in the form of their salts or quaternary ammonium compounds.

The new compounds are obtained in the form of the ester bases, or salts or quaternary compounds thereof. From the salts, the free tertiary amines or ammonium compounds can be obtained in per se known manner. From the bases conversely, by reaction with acids which more especially are suitable for the formation of therapeutically useful salts, salts can be obtained, as for example those of the hydrohalic acids, nitric acid, phosphoric acid, thiocyanic acid, malic acid, methane sulphonic acid, hydroxyethane sulphonic acid, benzene or toluene sulphonic acids or other therapeutically active acids. Tertiary amine products can be quaternated in per se customary manner.

The compounds of the present invention—including the esters, salts and ammonium compounds—are solid crystalline compounds at room temperature (about 20–30° C.) and are pharmacologically very active. They are distinguished for example by their excellent action on the parasympathicus, and they are also useful in therapy as spasmolytica. They have further utility as intermediates in the preparation of other therapeutica.

Presently-preferred representative embodiments of the invention are set forth in the following illustrative examples. In such examples, the relationship between parts by weight and parts by volume is the same as that between grams and mililiters. The temperatures are in degrees centigrade. Percentages are by weight.

Example 1

4.1 parts by weight of diphenylacetic acid chloride in pyridine solution are added to 3 parts by weight of 1-hydroxymethyl-tropinone. After 6 hours, the pyridine is removed under reduced pressure, the residue is stirred up with water, and the mixture rendered alkaline with aqueous caustic soda solution. The alkaline solution is shaken out with chloroform. After drying the chloroform extract and removing the solvent, the residual oil is distilled in a high vacuum. The boiling point of the so-obtained 1-hydroxymethyl-tropinone-diphenylacetic acid ester

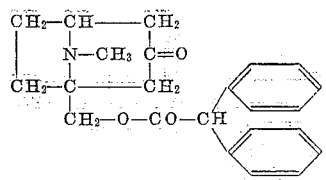

is 160–170°/0.06 mm. From the ester in alcohol solution and with the calculated quantity of picric acid, the picrate—melting at 187° (with decomposition)—is prepared.

The 1-hydroxymethyl-tropinone, used as starting material, is prepared as follows:

40.5 parts by weight of 2,5-dimethoxy-2-hydroxymethyl-tetrahydrofurane are kept at 70° for ½ hour in 390 parts by volume of 0.1-normal sulfuric acid. The solution is then cooled to room temperature and added dropwise, in the course of ½ hour and while stirring, into a mixture of 75 parts by weight of acetone-dicarboxylic acid (neutralized in 440 parts by volume of water with 52.2 parts by weight of lime) and 240 parts by volume of a 35% methylamine solution. The reaction mixture is additionally stirred for 3 hours and then allowed to stand for 2 hours, after which it is evaporated to dryness under reduced pressure at about 40°. The residue is taken up in normal sulfuric acid until the cloudy solution has an acid reaction to Congo red. The initially strong $CO_2$- evolution can be carried to completion by heating on the water-bath, whereupon the liquid is cooled to room temperature and filtered from the precipitated calcium sulfate. The light brown filtrate is made strongly alkaline with aqueous caustic potash solution, saturated with sodium chloride, again filtered and extracted with ether for 3 days. Upon evaporating off the ether, 25 parts by weight of crude base remain behind which, after distillation in high vacuum, are taken up in 100 parts by volume of alcohol, whereupon the calculated quantity of alcoholic picric acid is added to the hot alcoholic solution. Upon cooling, 46.5 parts by weight of picrate are obtained. After several recrystallizations, the thus-prepared 1-hydroxymethyl-tropinone picrate melts at 191° (with decomposition).

*Example 2*

1-hydroxymethyl-tropinone is acetylated by treatment with acetic anhydride in pyridine, after the manner described in Example 1. The so-obtained 1-acetoxymethyl-tropinone of the formula

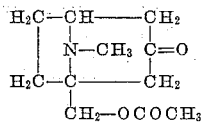

boils at 105–110° (0.04 mm.). Recrystallized from alcohol, the picrate melts at 165°.

*Example 3*

1.6 parts by weight of benzoyl chloride are added to 2 parts by weight of 1-methoxymethyl-pseudotropine and heated until a clear thinly-fluid melt is obtained. Upon cooling, the melt solidifies to a glassy product. It is dissolved in 20 parts by volume of water, and the solution is made alkaline with the calculated quantity of aqueous potassium hydroxide solution. The resultant cloudy solution is extracted three times with 30 parts by volume of ether. The dry ether extract is freed of solvent and the residue—the benzoic acid ester of 1-methoxymethyl-pseudotropine—

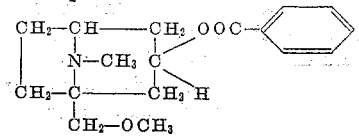

is distilled in high vacuum. To the liquid distillate, there is added the calculated quantity of picric acid (2.4 parts by weight dissolved in 20 parts by volume of alcohol), whereupon the picrate of the said ester immediately crystallizes out. Recrystallized from acetone-water, the picrate melts at 183°.

The 1-methoxymethyl-pseudotropine, used as starting material, can be prepared as follows:

14 parts by weight of 2,5-dimethoxy-2-methoxymethyl-tetrahydrofurane are dissolved in 140 parts by volume of 0.1-normal sulfuric acid and heated to 75° for 15 minutes, complete hydrolysis of the acetal taking place. The hydrolysate is cooled and then neutralized with 1.5 parts by weight of calcium carbonate. The neutral aqueous aldehyde solution is added dropwise, in the course of ½ hour and while stirring, to a mixture of 24.4 parts by weight of acetone-dicarboxylic acid, 27 parts by weight of calcium carbonate, 156 parts by volume of water and 70 parts by volume of 40% methylamine. The reaction mixture is allowed to stand for 2 days at room temperature, whereupon it is carefully adjusted with 3-normal hydrochloric acid until it is acid to Congo red. After the violent $CO_2$- evolution has subsided, the reaction mixture is heated until gas development has practically ceased. The reaction mixture is made strongly alkaline with potassium carbonate and is then extracted with ether for 3 days. From the ether extract, the base is shaken out with 3-normal hydrochloric acid, again liberated with solid potassium carbonate and taken up in ether. After drying and evaporating off the ether, there remains behind a weakly brownish-colored oil which can be purified by distillation under reduced pressure (boiling point=130°/12 mm.). There is thus obtained the 1-methoxymethyl-tropinone of the formula

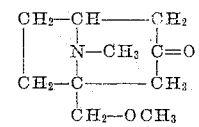

the picrate of which, prepared in ethanolic solution, melts at 171–172° (with decomposition). A quantity of 1-methoxy-methyl-tropinone corresponding to 7 parts by weight of the picrate is reduced with 10 parts by weight of sodium in 150 parts by volume of n-butanol. After acidification of the reaction mixture and removal of the butanol, the base—liberated with the aid of aqueous potassium hydroxide solution—is exhaustively extracted with chloroform and is then distilled. The so-prepared 1-methoxymethyl-pseudo-tropine of the formula

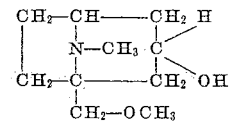

boils at 110° (air bath temperature) under a pressure of 0.04 mm. Hg.

*Example 4*

3 parts by weight of 1-methoxymethyl-tropine are heated with 3.8 parts by weight of diphenylacetic acid chloride to fusion, after which 15 parts by volume of pyridine are added. The mixture is heated until dissolution is achieved. After standing for 12 hours at room temperature, the pyridine is removed as completely as possible under reduced pressure, and the residue is taken up in water. The solution is adjusted to acidity to Congo red and again extracted with ether. The aqueous solution is made strongly alkaline with potassium hydroxide and the milky emulsion is extracted with chloroform. The chloroform extract is dried over magnesium sulfate, the chloroform evaporated off, and the residue distilled at 130–140° in a high vacuum. The so-obtained colorless viscous oil is the diphenylacetic acid ester of 1-methoxymethyl-tropine:

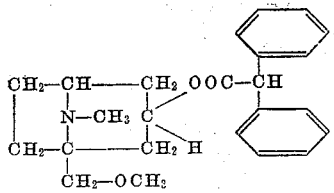

The picrate—prepared with the equimolecular quantity of picric acid in hot alcohol and crystallizing out upon cooling—melts at 154°.

The 1-methoxymethyl-tropine, used as starting material, can be prepared as follows:

7 parts by weight of 1-methoxymethyl-tropinone are hydrogenated in 50 parts by volume of glacial acetic acid containing 0.700 parts by weight of platinum oxide. Precisely the calculated quantity of hydrogen is taken up within 4 hours, whereupon the hydrogenation ceases. The glacial acetic acid is removed under reduced pressure, the residue is taken up in the smallest possible quantity of water, and is then made strongly alkaline with potassium hydroxide and, in 10 portions, extracted with chloroform. The chloroform solution is dried over magnesium sulfate, evaporated, and the residue distilled in high vacuum. The colorless viscous oil (boiling point=about 110°/0.05 mm.) solidifies, after standing for several days, in the form of colorless prisms. The so-obtained 1-methoxymethyl-tropine of the formula

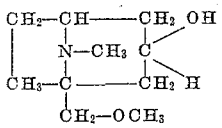

melts at 70°. Its picrate is obtained by reaction with the equimolecular quantity of picric acid in hot alcohol, followed by crystallization upon cooling. After recrystallization from alcohol, it melts at 143°. In 50% aqueous acetone solution, it can be decomposed on an ion exchanger charged with chlorine ions. On evaporation of the solution, the crystalline hydrochloride is obtained.

*Example 5*

By replacing the 1-methoxymethyl-tropine of Example 4 by the equivalent quantity of 1-hydroxymethyl-tropine, and otherwise proceeding according to the said example, the corresponding diphenylacetic acid ester of 1-hydroxymethyl-tropine is obtained.

The 1-hydroxymethyl-tropine itself can be prepared as follows:

40.5 parts by weight of 2,5-dimethoxy-2-hydroxymethyl-tetrahydrofurane are maintained at 70° for ½ hour in 390 parts by volume of 0.1-normal sulfuric acid, after which the solution is cooled to room temperature and then added dropwise in the course of ½ hour to a mixture of 75 parts by weight of acetone-dicarboxylic acid (neutralized in 440 parts by volume of water with 52.2 parts by weight of lime) and 240 parts by volume of 35% methylamine solution. The reaction mixture is further stirred for three hours and then allowed to stand for 2 days, whereupon it is evaporated to dryness at about 40° under reduced pressure. The residue it taken up in normal-sulfuric acid until the turbid solution reacts acid to Congo red. The initially-vigorous $CO_2$- evolution is completed by heating on the water bath, whereupon the liquid is cooled to room temperature and filtered from precipitated calcium sulfate. The light brown filtrate is rendered strongly alkaline with caustic potash solution, saturated with sodium chloride, again filtered and extracted with ether for 3 days. On evaporation of the ether, 25 parts by weight of crude base remain, which after distillation under high vacuum is taken up in 100 parts by volume of alcohol, and the hot solution treated with the calculated quantity of alcoholic picric acid. On cooling, 46.5 parts by weight of picrate crystallize. After repeated recrystallization, the resulting picrate of the 1-hydroxymethyl-tropinone of the formula:

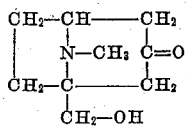

melts at 191° (with decomposition). 0.1256 part by weight of 1-hydroxymethyl-tropinone is hydrogenated in 10 parts by volume of glacial acetic acid in the presence of 0.500 part by weight of platinum oxide in a microhydrogenation apparatus. The ketone takes up exactly the calculated quantity of hydrogen within 20 minutes. The glacial acetic acid is removed under reduced pressure, and the residue taken up in a few drops of water and rendered alkaline with a few drops of potassium hydroxide solution. After extraction with chloroform and drying of the extract over magnesium sulfate, the solvent is removed and the base distilled under high vacuum. The distillate solidifies in the form of well-defined leaflets, which in the air take up water and deliquesce. 0.500 part by weight of the so-obtained 1-hydroxymethyl-tropine of the formula:

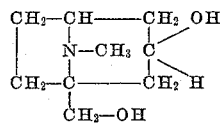

are treated hot with the calculated quantity of alcoholic picric acid. The picrate crystallizes immediately as well-defined prisms which, after recrystallization from isopropyl alcohol, give no clear melt up to 270°. The picrate decomposes gradually with dark coloration above 250° C.

*Example 6*

By replacing the 1-methoxymethyl-tropine of Example 4 by the equivalent quantity of 1-acetoxymethyl-tropine, and otherwise proceeding according to the said example, the corresponding diphenylacetic acid ester of 1-acetoxymethyl-tropine is obtained.

The 1-acetoxymethyl-tropine itself can be prepared as follows:

1-hydroxymethyl-tropinone is converted into the acetate in pyridine with acetic anhydride. The acetate is liquid and distills at 105–110° (air bath temperature) under 0.04 mm. pressure. The picrate of 1-acetoxymethyl-tropinone of the formula:

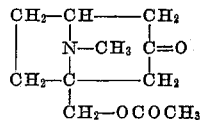

can be recrystallized from alcohol and melts at 165°. The ketone can be converted by catalytic reduction with platinum oxide in glacial acetic acid into the 1-acetoxymethyl-tropine of the formula:

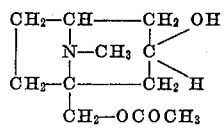

the picrate of which, recrystallized from alcohol, melts at 160°.

*Example 7*

By replacing the 1-methoxymethyl-tropine of Example 4 by the equivalent quantity of 1-carbomethoxy-tropine, and otherwise proceeding according to the said example, the corresponding diphenylacetic acid ester of 1-carbomethoxy-tropine is obtained.

The 1-carbomethoxy-tropine itself can be prepared as follows:

11.5 parts by weight of 2,5-dimethoxy-2-carbomethoxy-tetrahydrofurane are hydrolyzed with 87 parts by volume of 0.1-normal sulfuric acid and the solution neutralized with 1.3 parts by weight of calcium carbonate. The neutral hydrolysate is added dropwise with stirring within half an hour to a mixture of 18.1 parts by weight of acetone-dicarboxylic acid, 20 parts by weight of lime, 120 parts by volume of water and 50 parts by volume of 40% methylamine. After 2 days, the weakly light brown solution is rendered acid to Congo red with 50% sulfuric acid and heated until foaming ceases. The precipitated calcium sulfate is separated by centrifuging, the weakly brown solution extracted by shaking with ether and then rendered strongly alkaline with excess of baryta solution. The solution is centrifuged from barium sulfate and considerably concentrated under reduced pressure at 60° until the methylamine is removed and the solution is free from odor. The solution, alkaline with baryta, is carefully practically completely neutralized with dilute sulfuric acid and then all sulfate ions precipitated by addition of baryta. The neutral solution is again freed from barium sulfate by centrifuging and evaporated to dryness under reduced pressure at 60°. A brownish colored, crystalline product remains which is very easily soluble in water but difficultly soluble in alcohol. From alcohol-water, 6.3 parts by weight of colorless crystals separate out. 1-carboxy-tropinone crystallizes with ½ molecule of water of crystallization. Melting point =164° (with decomposition). 5 parts by weight of carboxy-tropinone are dissolved in 150 parts by volume of HCl-saturated methanol, the whole heated to boiling for half an hour and then allowed to stand overnight at room temperature. The methanol is removed under reduced pressure and the colorless glassy residue taken up in a little water and, under ether, rendered alkaline with sodium bicarbonate. The aqueous layer is extracted five times with 50 parts by volume of ether and the dried ether extract evaporated. The ester of the formula:

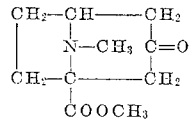

distills at 100° under 0.1 mm. pressure. It crystallizes immediately and melts at 72°. It can be converted by reduction with platinum oxide in glacial acetic acid, into the 1-carbomethoxy-tropine of the formula:

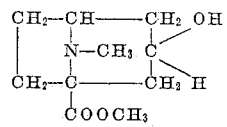

*Example 8*

5.2 parts by weight of 1-acetoxymethyl-tropine are dissolved in 30 parts by volume of pyridine, and then 15 parts by weight of phenyl-cyclohexyl-acetic acid chloride are added. After 12 hours, the reaction mixture is heated for 1 hour on the water bath, then freed as far as possible from pyridine under reduced pressure. The resultant viscous residue is stirred with 100 parts by volume of 1-normal hydrochloric acid. The separated excess phenyl-cyclohexyl-acetic acid is removed by shaking out several times with ether. The acid aqueous solution is then rendered alkaline with aqueous caustic potash solution, and the separated ester base is taken up in chloroform. The crude base can be purified by chromatographing on aluminum oxide with benzene and distilling in high vacuum. The so-obtained 1-acetoxymethyl-tropine-phenyl-cyclohexyl acetic acid ester is a colorless viscous liquid, from which the iodomethylate can be obtained with the aid of methyl iodide. The chloromethylate can be prepared by reacting the iodomethylate, in aqueous solution, with freshly precipitated AgCl. The hydrochloride of the pure ester base can not be crystallized.

The acylating agents used in the foregoing examples can be replaced by acylating derived from any of the other carboxylic acids, hereinbefore enumerated.

The quaternating agents employed in the examples may be replaced by any other conventional quaternating agent, alkyl halide or other alkyl ester of an inorganic acid, etc.

The ester bases of the examples or the quaternary ammonium compounds can be converted to the salts of any of the hereinbefore enumerated salt-forming acids.

Having thus disclosed the invention, what is claimed is:

1. A compound selected from the group consisting of nortropanes which correspond to the formula

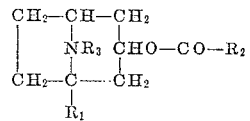

therapeutically-useful salts thereof with acids, and the quaternary ammonium compounds thereof, wherein $R_1$ stands for a member selected from the group consisting of carbomethoxy, methoxymethyl, acetoxymethyl and diphenyl-acetoxy-methyl, $R_2$ stands for a member selected from the group consisting of phenyl, benzhydryl and ω-cyclohexyl-benzyl, and $R_3$ stands for lower alkyl.

2. The 1-methoxymethyl-pseudotropine-benzoic acid ester.

3. The 1-methoxymethyl-tropine-diphenylacetic acid ester.

4. The 1-acetoxymethyl-tropine-phenyl-cyclohexyl-acetic acid ester.

No references cited.